US007236615B2

(12) United States Patent
Miller et al.

(10) Patent No.: US 7,236,615 B2
(45) Date of Patent: Jun. 26, 2007

(54) SYNERGISTIC FACE DETECTION AND POSE ESTIMATION WITH ENERGY-BASED MODELS

(75) Inventors: Matthew L. Miller, Princeton, NJ (US); Margarita Osadchy, Haifa (IL); Yann LeCun, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 264 days.

(21) Appl. No.: 11/095,984

(22) Filed: Mar. 31, 2005
(Under 37 CFR 1.47)

(65) Prior Publication Data

US 2006/0034495 A1    Feb. 16, 2006

Related U.S. Application Data

(60) Provisional application No. 60/559,986, filed on Apr. 6, 2004.

(51) Int. Cl.
*G06K 9/00* (2006.01)
(52) U.S. Cl. .................. 382/118; 382/159; 382/173; 358/403
(58) Field of Classification Search ............. 382/118, 382/159, 173, 181; 358/403
See application file for complete search history.

(56) References Cited

U.S. PATENT DOCUMENTS 5,649,068 A * 7/1997 Boser et al. ................. 706/12
6,959,109 B2 * 10/2005 Moustafa ..................... 382/159
2004/0264745 A1 * 12/2004 Gu et al. ..................... 382/118
2005/0180626 A1 * 8/2005 Moon et al. ................. 382/159
2006/0034495 A1 * 2/2006 Miller et al. ................ 382/118
2006/0078172 A1 * 4/2006 Zhang et al. ................ 382/118

OTHER PUBLICATIONS

Y.Li, S.Gong, and H. Liddell in an article entitled "Support vector regression and classification based on multi-view face detection and recognition", which was presented at FG2000.*

(Continued)

*Primary Examiner*—Joseph Mancuso
*Assistant Examiner*—Nancy Bitar
(74) *Attorney, Agent, or Firm*—Brosemer, Kolefas & Associates LLC

(57) ABSTRACT

A method for human face detection that detects faces independently of their particular poses and simultaneously estimates those poses. Our method exhibits an immunity to variations in skin color, eyeglasses, facial hair, lighting, scale and facial expressions, and others. In operation, we train a convolutional neural network to map face images to points on a face manifold, and non-face images to points far away from that manifold, wherein that manifold is parameterized by facial pose. Conceptually, we view a pose parameter as a latent variable, which may be inferred through an energy-minimization process. To train systems based upon our inventive method, we derive a new type of discriminative loss function that is tailored to such detection tasks. Our method enables a multi-view detector that can detect faces in a variety of poses, for example, looking left or right (yaw axis), up or down (pitch axis), or tilting left or right (roll axis). Systems employing our method are highly-reliable, run at near real time (5 frames per second on conventional hardware), and is robust against variations in yaw (±90°), roll(±45°), and pitch(±60°).

5 Claims, 4 Drawing Sheets

OTHER PUBLICATIONS

Estimating Facial Pose from a sparse representation (Hankyu Moon and Matt Miller NEC Laboratories America; 2004 International conference on image processing; ICP).*

Face Alignment Under Various Poses and Expressions; Shengjun Xin and Haizhou Ai; Computer Science and Technology Department, Tsinghua University, Beijing 100084, China; ahz@mail.tsinghua.edu.cn.*

Learning a Sparse representation from multiple still images for on-line face recognition in an unconstrained environment, Shouten et al; IEEE 2006.*

View Based and modular eigenspaces for face recognition; CVPR, 1994; A pentland B. Moghaddam and T. Starner.*

Fast Multi View Face detection; M.Jones and P. Viola ; 2003-96, Mitsubishi Electric Research Laboratories, 2003.*

* cited by examiner

SYNERGISTIC FACE DETECTION AND POSE ESTIMATION WITH ENERGY-BASED MODELS

CROSS REFERENCE TO RELATED APPLICATIONS

This application claims the benefit of U.S. Provisional Application No. 60/599,986 filed on Apr. 6, 2004, the contents of which are incorporated herein by reference.

FIELD OF THE INVENTION

The present invention relates generally to the field of human face detection and in particular to human face detection and facial pose estimation.

BACKGROUND OF THE INVENTION

The detection of human faces in natural images and videos is a key component of a variety of applications in human-computer interaction, search and indexing, security and surveillance. As a result, face detection approaches—and in particular learning-based approaches to face detection abound—including real-time methods such as those described by P. Viola and M. Jones, in a paper entitled "Rapid Object Detection Using a Boosted Cascade of Simple Features", which appeared in Proceedings, IEEE Conf. on Computer Vision and Pattern Recognition, pp. 511-518 in 2001. Approaches based on convolutional networks have also been explored and described in various publications, including a paper by R. Vaillant, C. Monrocq and Y. LeCun entitled "Original Approach For the Localisation of Objects in Images", that appeared in IEEE Proc. on Vision, Image, and Signal Processing, vol 141(4): pp. 245-250 in August 1994 and one by C. Garcia and M. Delakis entitled "A Naural Architecture for Fast and Robust Face Detection", which appeared in IEEE-IAPR Int. Conference on Pattern Recognition, pp. 40-43, in 2002.

An alternative approach—a view-based approach—involves building separate detectors for different views and either: 1) applying them in parallel (see., e.g., A. Pentland, B. Moghaddam, and T. Starner, "View-Based and Modular Eigenspaces for Face Recognition", CVPR, 1994; K. Sung and T. Poggio, "Example-Based Learning of View-Based Human Face Detection", PAMI, Vol. 20, pp. 39-51, 1998; H. Schneidermn and T. Kanade, "A Statistical Method for 3D Object Detection Applied to Faces and Cars", Computer Vision and Pattern Recognition, 2000; and S. Z. Li, L. Zhu, Z. Zhang, A. Blake, H. Zhang, and H. Shum, "Statistical Learning of Multi-View Face Detection", Proceedings of the $7^{th}$ European Conference on Computer Vision—Part IV", 2002); or 2) using a pose estimator to select a detector as was described in "Fast Multi-View Face Detection", written by M. Jones and P. Viola, in a Technical Report R2003-96, Mitsubishi Electric Research Laboratories, 2003.

Yet another approach to human face detection—described by H. A. Rowley, S. Baluja, and T. Kanade in a paper entitled "Rotation Invarient Neural Network-Based Face Detection", that appeared in Computer Vision and Pattern Recognition", in 2000—estimates and corrects in-plane rotations before applying a single pose-specific detector.

Finally, in still another approach, a number of Support Vector Regressors are trained to approximate smooth functions, each of which has a maximum for a face at a particular pose. Such an approach was disclosed in a paper entitled "Support Vector Regresion and Classification Based Multi-View Face Detection and Recognition", authored by Y. Li, S. Gong and H. Liddel and published in Face and Gesture, in 2000. This approach requires another machine trained to convert resulting values to estimates of poses and a third machine trained to convert the values into a face/non-face score. As can be appreciated such approaches are very slow.

Given the limited success experienced by prior-art approaches, new systems and methods that facilitate the real-time, simultaneous, multi-view face detection and facial pose estimation would represent a great technological step forward. Such a system and method are the subject of the present invention.

SUMMARY OF THE INVENTION

We have developed a method for human face detection that not only detects faces independently of their particular poses, but simultaneously estimates those poses as well.

Viewed from a first aspect, our invention is directed to a method that performs multi-view face detection and pose estimation simultaneously, while advantageously exhibiting an immunity to variations that infirmed prior-art approaches, namely variations in skin color, eyeglasses, facial hair, lighting, scale and facial expressions, to name just a few.

According to our inventive teachings, we train a convolutional neural network to map face images to points on a face manifold, and non-face images to points far away from that manifold, wherein that manifold is parameterized by facial pose. Conceptually, we view a pose parameter as a latent variable, which may be inferred through an energy-minimization process. To train systems based upon our inventive method, we derive a new type of discriminative loss function that is tailored to such detection tasks.

Advantageously, our method enables a multi-view detector that can detect faces in a variety of poses, for example, looking left or right (yaw axis), up or down (pitch axis), or tilting left or right (roll axis). Systems employing our method are highly-reliable, run at near real time (5 frames per second on conventional hardware), and is robust against variations in yaw (±90°), roll(±45°), and pitch(±60°).

These and other advantages of the invention will be apparent to those of ordinary skill in the art by reference to the following detailed description and the accompanying drawings.

DETAILED DESCRIPTION

Figure 1:
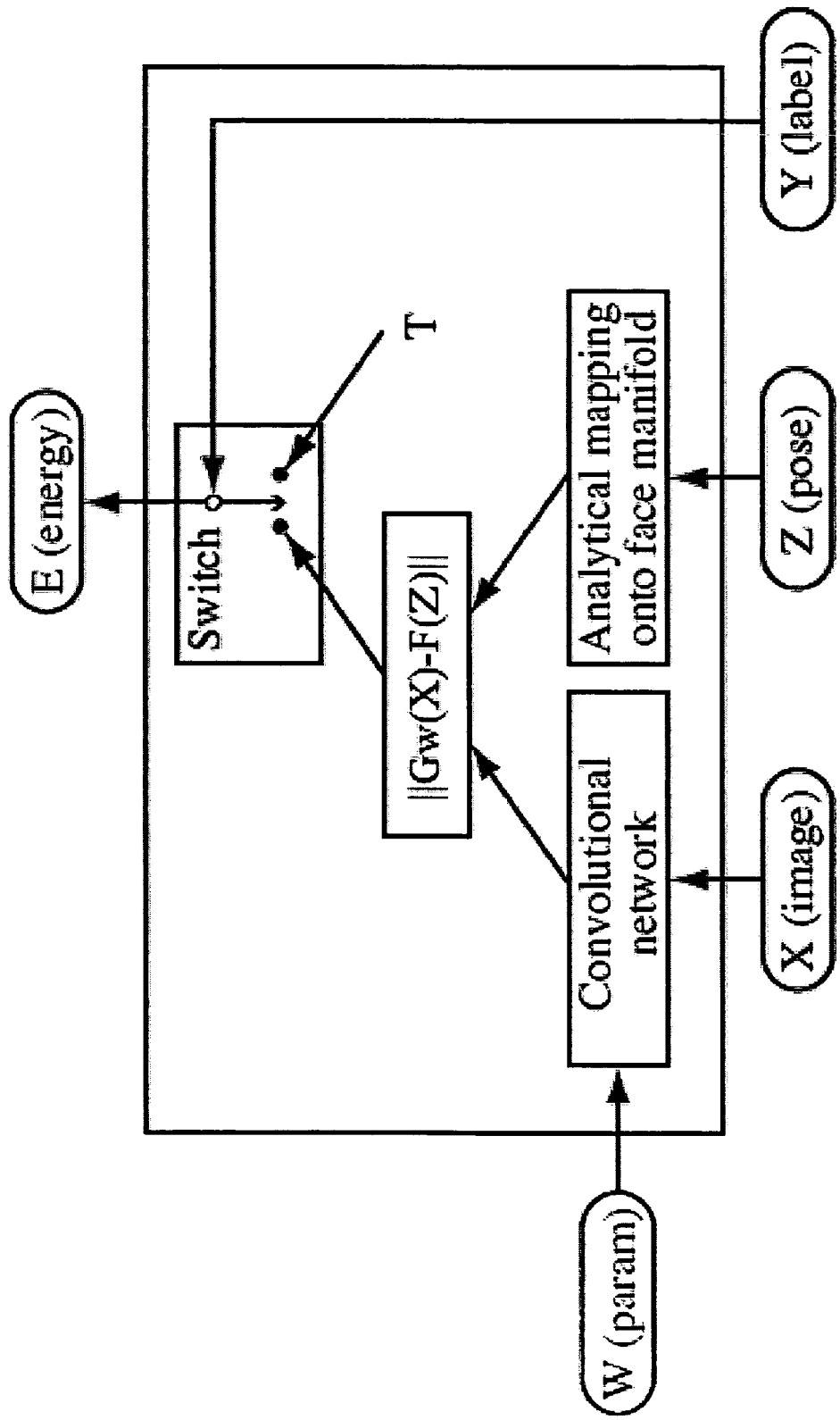
FIG. 1 is an architectural block diagram of a minimum energy machine according to the present invention.

Advantageously, and according to the teachings of the present invention, our system integrates solutions to two synergistic problems, namely face detection and pose estimation. And since we desire to obtain better results on both tasks, our approach is not merely a cascaded system in which an answer to one problem is used to assist in solving the other. In sharp contrast to such a cascaded approach, our approach requires and resulting method reflects the fact that both answers are derived from one underlying analysis of the input, and both tasks are trained together.

Accordingly, our approach and resulting method produces a trainable system that can map raw images X to points in a low-dimensional space. In that space, we pre-define a face-manifold F(Z) that we parameterize by the pose Z. We then train the system to map face images with known poses to the corresponding points on the manifold. Additionally, we train it to map non-face images to points far away from the manifold. Proximity to the manifold then indicates whether or not an image is a face, and projection to the manifold yields an estimate of the pose.

Paramaterizing the Face Manifold: To understand the working of our inventive approach and resulting method, we begin by describing the details of the face manifold. To begin, let us start with the simplest case of a single pose parameter Z=θ, representing say, yaw. Since we want to preserve the natural topology and geometry of the problem, the face manifold under yaw variations in the interval [−90°, +90°] should be a half-circle with constant curvature. We then embed this half-circle in a three-dimensional space using three equally-spaced shifted cosines.

$$F_i(\theta) = \cos(\theta - \alpha_i); i = 1, 2, 3; \theta = \left[-\frac{\pi}{2}, \frac{\pi}{2}\right] \quad [1]$$

When we run the network on an image X, it outputs a vector G(X) with three components that can be decoded analytically into a corresponding pose angle:

$$\bar{\theta} = \arctan \frac{\sum_{i=1}^{3} G_i(X)\cos(\alpha_i)}{\sum_{i=1}^{3} G_i(X)\sin(\alpha_i)} \quad [2]$$

Where the point on the manifold closest to G(X) is just F($\bar{\theta}$).

As can be readily appreciated, the same approach may be applied to any number of pose parameters. For example, let us consider the set of all faces with yaw in [−90°, +90°] and roll in [−45°, +45°]. In an abstract way, this set is isomorphic to a portion of the surface of a sphere. Consequently, we encode this pose with the product of the cosines of the two angles:

$$F_{ij}(\theta,\phi)=\cos(\theta-\alpha_i)\cos(\phi-\beta_j); i,j=1, 2, 3; \quad [3]$$

For convenience, we rescale the roll angles to the range of [−90°, +90°]. With these paramaterizations, the manifold has constant curvature, which ensures that the effect of errors will be the same regardless of pose. Given nine components of the network's output $G_{ij}(X)$, we compute the corresponding pose angles as follows:

$$cc=\Sigma_{ij}G_{ij}(X)\cos(\alpha_i)\cos(\beta_j); cs=\Sigma_{ij}G_{ij}(X)\cos(\alpha_i)\sin(\beta_j);$$

$$sc=\Sigma_{ij}G_{ij}(X)\sin(\alpha_i)\cos(\beta_j); ss=\Sigma_{ij}G_{ij}(X)\sin(\alpha_i)\sin(\beta_j);$$

$$\bar{\theta}=0.5(atan2(cs+sc,cc-ss)+atan2(sc-cs,cc+ss))$$

$$\bar{\phi}=0.5(atan2(cs+sc,cc-ss)-atan2(sc-cs,cc+ss)) \quad [4]$$

Note that the dimension of the face manifold is much lower than that of the embedding space. This gives ample space to represent non-faces away from the manifold.

To build our learning machine, we make advantageous use of the Minimum Energy Machine framework described in a Technical Report by F. J. Huang and Y. LeCun entitled "Loss Functions for Discriminative Training of Energy-Based Graphical Models", published by the Courant Institute of Mathematical Sciences of New York University in June 2004.

Energy Minimization Framework: To facilitate understanding, we can view our method and resulting system as a scalar-value function $E_W(Y,Z,X)$, where X and Z are defined as above, Y is a binary label (Y=1 for face, Y=0 for a non-face), and W is a parameter vector subject to learning. Additionally, $E_W(Y,Z,X)$ can be interpreted as an energy function that measures the degree of compatibility between X,Z,Y. If X is a face with pose Z, then we want: $E_W(1,Z,X)<<E_W(0,Z',X)$ for any pose Z', and $E_W(1,Z,X)>>E_W(0,Z',X)$ for any pose Z'≠Z.

Operating the machine comprises the clamping of X to the observed value (the image), and finding the values of Z and Y that minimize $E_W(Y,Z,X)$:

$$(\bar{Y},\bar{Z})=arg\ min_{Y\in\{Y\},Z\in\{Z\}}E_W(Y,Z,X) \quad [5]$$

Where {Y}={0, 1} and {Z}=[−90, 90]×[−45, 45] for yaw and roll variables. Although this inference process can be viewed probalistically as finding the most likely configuration of Y and Z according to a model that attributes high probabilities to low-energy configurations (.e.g. a Gibbs distribution), we view it as a non probabilistic decision making process. In other words, we make no assumption as to the finiteness of integrals over {Y} and {Z} that would necessary for a properly normalized probabilistic model. Consequently, this affords us considerable flexibility in the choice of the internal architecture of $E_W(Y,Z,X)$.

Our energy function for a face $E_W(1,Z,X)$ is defined as the distance between the point produced by the network $G_W(X)$ and the point with pose Z on the manifold F(Z):

$$E_W(1,Z,X)=\|G_W(X)-F(Z)\| \quad [6]$$

The energy function for a non-face $E_W(0,Z,X)$ is equal to a constant T that we can interpret as a threshold (it is independent of Z and X). The complete energy function is:

$$E_W(Y,Z,X)=Y\|G_W(X)-F(Z)\|+(1-Y)T \quad [7]$$

With reference now to FIG. 1 there is shown an architectural block diagram for a minimum energy machine useful for our face detection, pose estimation problem(s). Operating this machine (finding the output label and pose with the smallest energy) requires that we first find $\bar{Z}=arg\ min_{Z\in\{Z\}}\|G_W(X)-F(Z)\|+)1-Y)T$, and then comparing this minimum distance, $\|G_W(X)-F(\bar{Z})\|$, to the threshold T. If it is smaller than T, then X is classified as a face, otherwise X is classified as a non-face. This decision is implemented in the architectural block diagram of FIG. 1 as a switch.

Convolutional Network: Advantageously, we employ a convolutional network as the basic architecture for our $G_W(X)$ image-to-face mapping function. As is known (See, for example Y. LeCun, L. Bottoyu, Y. Bengio and P. Haffner, "Gradient-based Learning Applied to Document Recognition", Proceedings of the IEEE, 86(11):2278-2324, November 1998) convolutional networks are "end-to-end" trainable systems that can operate on raw pixel images and learn low-level features and high-level representation in an integrated fashion. Convolutional networks are particularly advantageous for our purposes because they easily learn the types of shift-invariant local features that are relevant to image recognition, and more importantly, convolutional networks can be replicated over large images (swept over every location) at a fraction of the "cost" of replicating more traditional classifies. As can be readily appreciated by those skilled in the art, such characteristics offer considerable advantage in constructing real-time systems such as that which is the subject of the instant invention.

Our network architecture advantageously employs eight (8) feature maps in a bottom convolutional and subsampling layers and twenty (20) maps in the next two layers. The last layer has nine (9) outputs to encode two (2) pose parameters.

Training with a Discriminative Loss Function for Detection: For our purposes, we define the loss function as follows:

$$\text{Loss}(W) = \frac{1}{|S_1|}\sum_{i \in S_1} L_1(W, Z^i, X^i) + \frac{1}{|S_0|}\sum_{i \in S_1} L_0(W, X^i) \quad [8]$$

where $S_1$ is the set of training faces, $S_0$ is the set of non-faces, $L_1(W,Z^i,X^i)$ and $L_0(W,X^i)$ are loss functions for a face sample (with a known pose) and non-face sample, respectively. At this point, we should probably mention that while our exemplary training described here includes a face sample with a known pose(s), our inventive approach and resulting method will advantageously accommodate face samples whose pose(s) is unknown.

As can be appreciated, the loss function, Loss(W) should be designed so that its minimization for a particular positive training sample $(X^i,Z^i,1)$ will make $E_W(1,Z^i,X^i) < E_W(Y,Z,X^i)$ for $Y \neq Y^i$ or $Z \neq Z^i$. To satisfy this condition, it is sufficient to make $E_W(1,Z^i,X^i) < E_W(0,\bar{Z},X^i)$. For a particular negative training sample $(X^i,0)$, minimizing the loss should make $E_W(1,Z,X^i) > E_W(0,Z,X^i) = T$ for any Z. To satisfy this, it is sufficient to make $E_W(1,\bar{Z},X^i) > T$.

Continuing, we let W be the current parameter value, and W' be the parameter value after an update caused by a single sample. To cause our minimum energy machine to achieve the desired behavior, we need the parameter update to decrease the difference between the energy of the desired label and the energy of the undesired label. In our case, since $E_W(0,Z,X) = T$ is constant, the following condition on the update is sufficient to ensure the desired behavior:

Condition 1: For a face example $(X,Z,1)$, we must have: $E_{W'}(1,Z,X) < E_W(1,Z,X)$; For a non-face example $(X,1)$, we must have: $E_{W'}(1,\bar{Z},X) > E_W(1,\bar{Z},X)$. We choose the following forms for $L_1$ and $L_0$:

$$L_1(W,1,Z,X) = E_W(1,Z,X)^2; \; L_0(W,X,0) = K\exp[-E(1,\bar{Z},X)] \quad [9]$$

where K is a positive constant.

Next, we show that minimizing equation [9] with an incremental gradient-based algorithm will satisfy this condition 1. With gradient-based optimization algorithms, the parameter update formula is of the form:

$$\delta W = W' - W = -\eta A \frac{\delta L}{\delta W},$$

where A is a judiciously chosen symmetric positive semi-definite matrix, and $\eta$ is a small positive constant.

For those situations where Y=1, (face) an update step will change the parameter by:

$$\delta W = -\eta A \frac{\partial E_W(1, Z, X)^2}{\partial W} = -2\eta E_W(1, Z, X) A \frac{\partial E_W(1, Z, X)}{\partial W}.$$

To the first order (for small values of $\eta$), the resulting change in $E_W(1,Z,X)$ is given by:

$$\left(\frac{\partial E_W(1, Z, X)}{\partial W}\right)^T \delta W = $$

$$-2\eta E_W(1, Z, X)\left(\frac{\partial E_W(1, Z, X)}{\partial W}\right)^T A \frac{\partial E_W(1, Z, X)}{\partial W} < 0,$$

because $E_W(1,Z,X) > 0$ (it's a distance), and the quadratic form is positive. Therefore, $E_{W'}(1,Z,X) < E_W(1,Z,X)$.

For those situations where Y=0, (non-face) an update step will change the parameter by $$\delta W = -\eta A \frac{\partial K\exp[-E(1, \bar{Z}, X)]}{\partial W}$$

$$= \eta K\exp[-E_W(1, \bar{Z}, X)] \frac{\partial E_W(1, \bar{Z}, X)}{\partial W}.$$

To the first order (for small values of $\eta$, the resulting change in $E_W(1,\bar{Z},X)$ is given by:

$$\left(\frac{\partial E_W(1, Z, X)}{\partial W}\right)^T \delta W = $$

$$\eta K\exp[-E_W(1, Z, X)]\left(\frac{\partial E_W(1, \bar{Z}, X)}{\partial W}\right)^T A \frac{\partial E_W(1, \bar{Z}, X)}{\partial W} > 0$$

therefore $E_{W'}(1,\bar{Z},X) > E_W(1,\bar{Z},X)$.

Running the Machine: Our detection works on grayscale images and it applies the network to each image at a range of scales, stopping by a factor of $\sqrt{2}$. The network is replicated over the image at each scale, stepping by 4 pixels in the x and y directions. As should be noted, this 4 pixel step size is a consequence of having two, 2×2 subsampling layers.

At each scale and location, the network outputs are compared to the closest point on the manifold, and the system collects a list of all instances closer than out detection threshold. Finally, after examining all scales, the system identifies groups of overlapping detections in the list and discards all but the strongest (closest to the manifold) from each group. No attempt is made to combine directions or apply any voting scheme.

For our exemplary system, we have implemented it in the C programming language. Additionally, the system so implemented can detect, locate, and estimate the pose of faces that are between 40 and 250 pixels high in a 640×480 image at roughly 5 frames/second on a 2.4 GHz Pentium 4 class computer. Of course, those skilled in the art will quickly recognize that the choice of programming language and particular computer is a matter of design choice, and more efficient and/or faster computers will only enhance the performance of our system.

Experiments and Results

Using the above, described architecture, we have constructed and evaluated a detector that locates faces and estimates two pose parameters, namely, yaw from lift to right profile and in-plane rotation from −45 to +45 degrees. Advantageously, the detector was trained to be robust against pitch variation.

We are now able to describe the training regimen for this network, and then give the results of two sets of experiments. The first set of experiments tests whether training for the two tasks together improves performance on both. The second set of experiments allows comparisons between our inventive system and other, published multi-view detectors.

Training: Our training set comprised 53,850, 32×32-pixel faces from natural images collected and hand annotated with appropriate facial poses. By way of additional background, the reader is referred to a paper entitled "Estimating Facial Pose From Sparse Representation", authored by H. Moon and M. L. Miler, which appeared in International Conference on Image Processing, Singapore, 2004, for a more thorough description of annotation procedure. These faces were selected from a much larger annotated set to yield a roughly uniform distribution of poses from left profile to right profile, each exhibiting a variation in pitch.

Our initial negative training data comprised 52,850 image patches chosen randomly from non-face areas of a variety of images. For our second set of experiments, we replaced substantially half of these with image patches obtained by running the initial version of the detector on our training images and collecting false detections. Each training image was used five (5) times during training, with random variations in scale from $\sqrt{2}$ to $x(1+\sqrt{2})$, in-plane rotation (±45°), brightness (±20), and contrast (from 0.8 to 1.3).

To train the network, we made 9 passes through this data, through it mostly converged after about the first six (6) passes. Training was performed using LUSH, and the total training time was bout 26 hours on a 2 GHz Pentium 4 computer. At the end of training, the network had converged to an equal error rate of approximately 5% on the training data and approximately 6% on a separate test set of substantially 90,000 images.

Synergy Tests: Our synergy tests were employed to demonstrate and verify that both face detection and pose estimation benefit from learning and running in parallel. To test our hypothesis, we built three networks having nearly identical architectures, but trained to perform different tasks.

The first of the three synergy test networks was trained for simultaneous face detection and pose estimation (combined). The second of the three synergy test networks was trained for detection only. The third of the three synergy test networks was trained for pose estimation only.

The second network—"detection only"—had only one output for indicating whether or not its input was a face. The third network—"pose only"—was identical to the first network—"combined"—but trained on faces only (no negative examples).

Figure 2B:
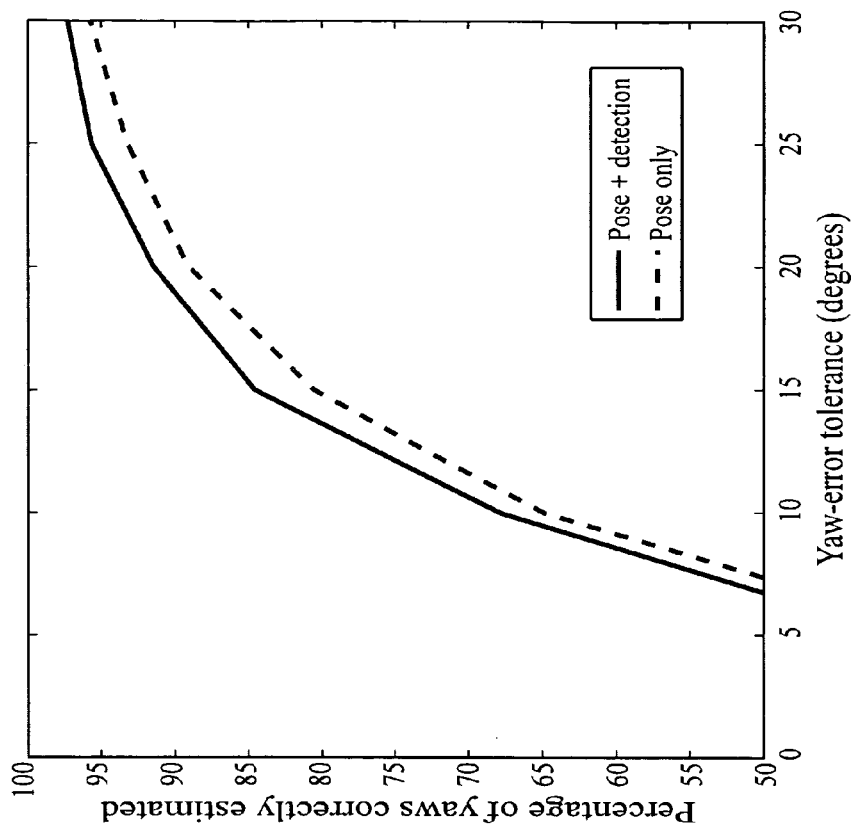
FIG. 2b is a graph showing frequency with which the pose-plus-detection and pose-only networks correctly estimated yaws within various error tolerances.
Figure 2A:
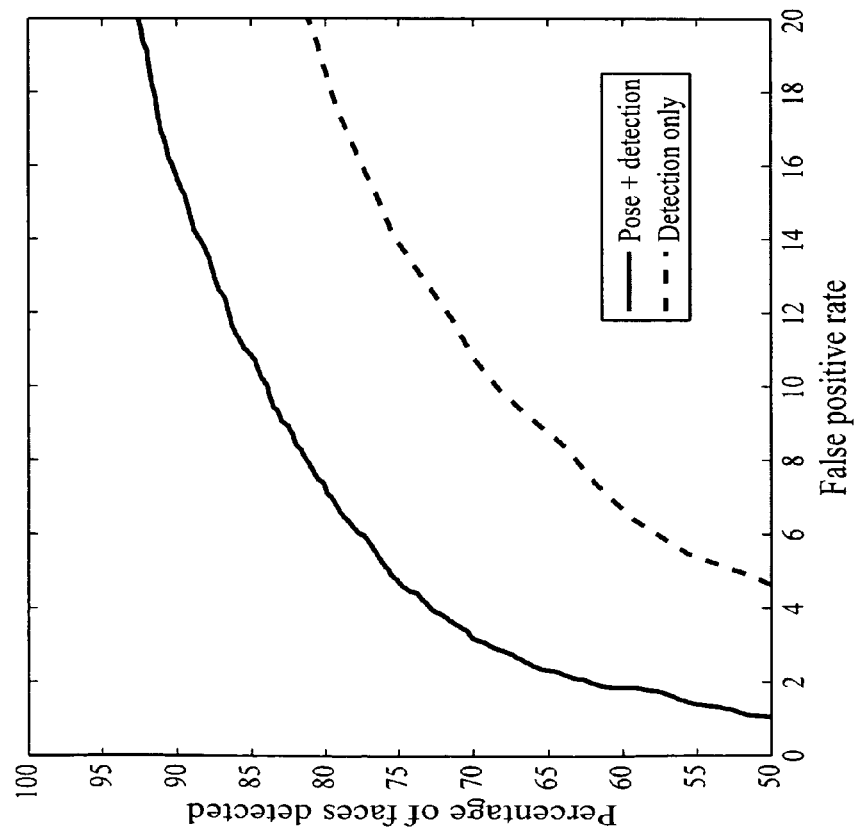
FIG. 2a is a graph showing ROC curves for pose-plus-detection and detection only networks.

Turning now to FIG. 2a and FIG. 2b, wherein FIG. 2a is a graph showing ROC curves for pose-plus-detection and detection only networks; and FIG. 2b is a graph showing frequency with which the pose-plus-detection and pose-only networks correctly estimated yaws within various error tolerances. From inspection of these figures, we see the results of running our synergy test networks on our 10,000 test images. As can be readily observed by inspecting the figures, we see that the pose-plus-detection network exhibited better performance, confirming that training for each task benefits the other.

Standard Data Sets: Unfortunately, there is no standard set of data that permits the testing of all the poses our system and method is designed to detect. There are, however, data sets that have been used to test more restricted face detectors described in the prior art, wherein each set focuses on a particular variation in pose. As can now be appreciated by those skilled in the art, by testing a single detector with all of these prior-art data sets, we can compare our performance against the results of the prior-art systems. The details of these sets are now described:

MIT+CMU: As described in publications authored by K. Sung. and T. Poggio, "Example-Based Learning of View-Based Human Face Detection", which appeared in PAMI, vol. 20, pp. 39-51 in 1998 and by H. A. Rowley, S. Baluja and T. Kanade, entitled "Neural Network-Based Face Detection", which appeared in PAMI, vol. 20, pp. 22-38 in 1998, 130 images for testing frontal face detectors are disclosed. And while we counted 517 faces in this set, the standard tests only use a subset of 507 of the faces as 10 of the faces are in the wrong pose or otherwise unsuitable for the tests. We also note that about 2% of the faces in the standard set are [badly]drawn cartoons, which our system is not designed to detect. Despite this lack of intention, we nevertheless included them in our reported results.

TILTED: As described in a 1998 publication entitled "Rotation Invarient Neural Network-Based Face Detection" that appeared in Computer Vision and Pattern Recognition and written by H. A. Rowley, S. Baluja and T. Kanade, this set comprises 50 images of frontal faces with in-plane rotations. Two hundred twenty-three (223) of the faces (out of 225) are in the standard subset. We note that about 20% of the faces in the standard subset are outside of the ±45° rotation range for which our system is designed. Again, we included these outlyers in our reported results.

PROFILE: As described by H. Schneidermn and T. Kanade in a publication entitled "A Statistical Method for 3D Object Detection Applied to Faces and Cars", in Computer Vision and Pattern Recognition in 2000, the data set comprises 208 images of faces in profile. And while there seems to be some disagreement in the prior art about the number of faces in the standard set of annotation, we found 353 annotations. However, we believe that these discrepancies do not significantly affect our reported results.

In performing our test(s), we counted a face as being detected if 1) at least one detection lay within a circle centered on the midpoint between the eyes, with a radius substantially equal to 1.25 times the distance from that point to the midpoint of the mouth, and 2) that detection came at a scale within a factor of two of the correct scale for the face's size. We determined that a detection was a false positive if it did not lie within this range for any faces in the image, including those faces not in the standard subset.

TABLE 1

| DataSet→ | TILTED | | PROFILE | | MIT + CMU | |
|---|---|---|---|---|---|---|
| False Positives per image→ | 4.42 | 26.90 | .47 | 3.36 | .50 | 1.28 |
| Our Detector | 90% | 97% | 67% | 83% | 83% | 88% |
| Jones & Viola (Tilted) | 90% | 95% | X | | X | |
| Jones & Viola (Profile) | X | | 70% | 83% | X | |
| Rowley | 89% | 96% | X | | X | |
| Schneiderman & Kanade | X | | 86% | 93% | X | |

Turning now to the data presented in Table 1, there it is shown comparisons of our results with other multi-view detectors. Each column in the Table 1 shows the detection rates for a given average number of false positives per image (corresponding to those for which other authors have reported results). The results for real-time detectors are shown in bolded typeface. Note that our detector which is the subject of the present invention can be tested on all data sets simultaneously. Of particular significance, our approach and resulting detector produces results similar in performance to the prior art detectors, including the non-real-time detectors. Importantly, the compared detectors—in sharp contrast to ours—are not designed to handle all variations in pose and do not yield pose estimates!

Figure 3B:
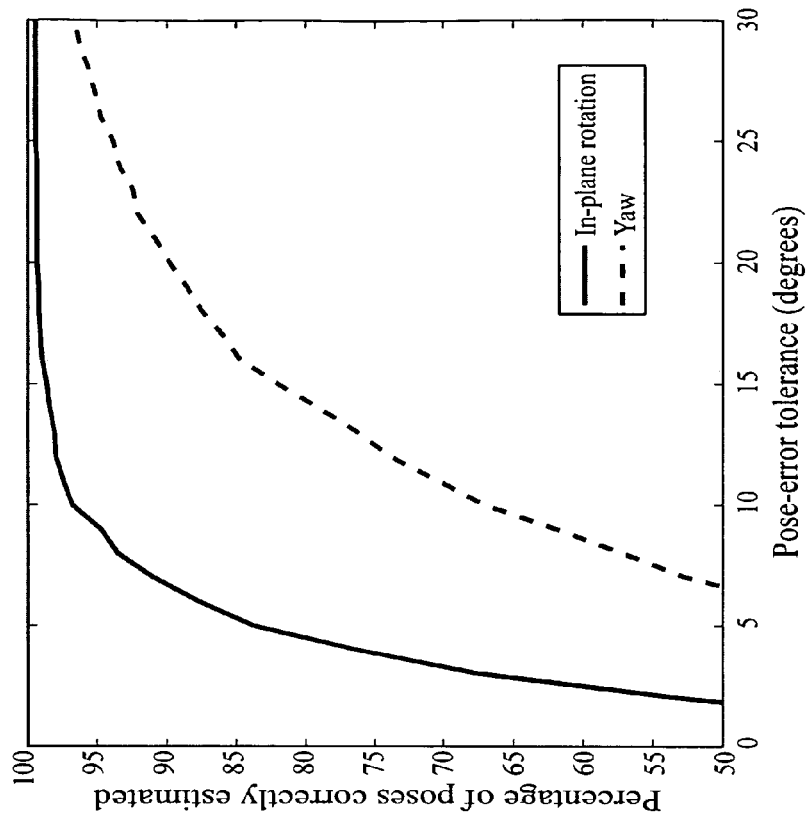
FIG. 3b shows the frequency with which yaw and roll are estimated within various error tolerances.
Figure 3A:
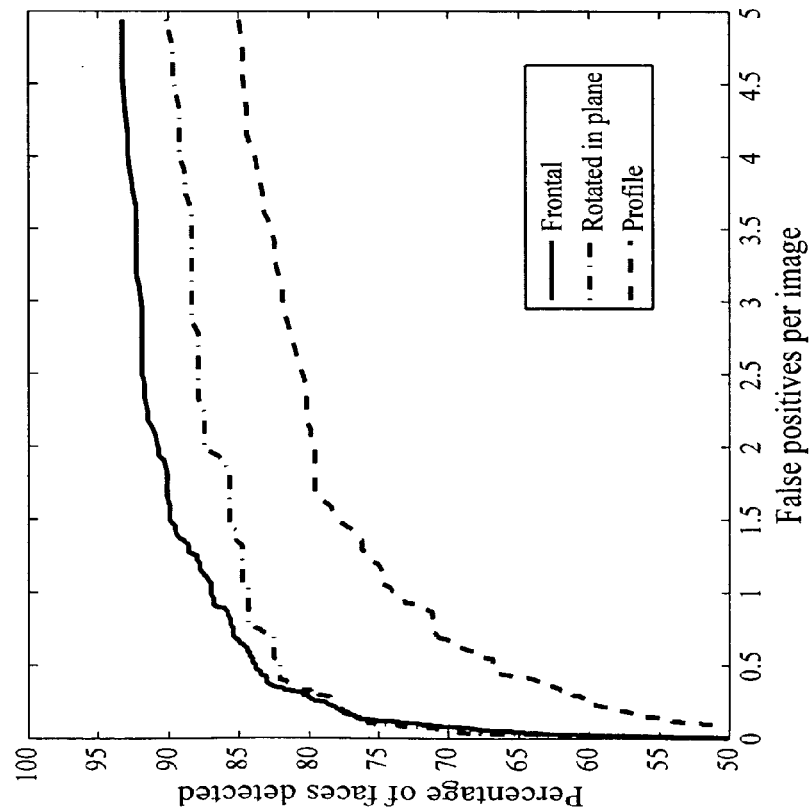
FIG. 3a shows ROC curves for our detector on the three standard data sets.
Figure 4:
FIG. 4 illustrates some example face detections according to our inventive method.

Turning now FIG. 3a and FIG. 3b, FIG. 3a shows ROC curves for our detector on the three standard data sets and FIG. 3b shows the frequency with which yaw and roll are estimated within various error tolerances. As can be appreciated, the curve depicted in FIG. 3b shows the performance of our method at pose estimation.

To produce the curve of FIG. 3b, we fixed the detection threshold at a value that resulted in about 0.5 false positives per image over all three data sets. We then compared the pose estimates for all detected faces (including those not in the standard subsets) against our manual pose annotations. Note further that this test is more difficult than typical tests of pose estimation systems, where faces are first localized by hand. When we hand-localized these faces, 89% of yaws and 100% of in-plane rotations are correctly estimated to within 15 degrees!

As can now be appreciated by those skilled in the art, the system and methods we have presented advantageously integrates detection and pose estimation by training a convolutional network to map faces to points on a manifole, parameterized by pose, and non-faces to points far from the manifold. The network is then trained by optimizing a loss function of three variables—image, pose and face/non-face. When the three variables match, the energy function is trained to have a small value. When they do not match, it is trained to have a large value.

Our experiences with our inventive method and resulting machine(s) indicate that our approach produces a number of desirable properties. First, the use of a convolutional network makes it very fast. At typical webcam resolutions for images, it can process 5 frames per second on a conventional, 2.4 GHz Pentium 4 class computer.

Second, our inventive method is robust to a wide range of poses, including variations in yaw up to ±90°, in-plane rotation up to ±45°, and pitch up to ±60°. As noted before, we have verified these results on three standard data sets, each designed to test robustness against a single dimension of pose variation.

Third, our inventive method advantageously produces estimates of facial poses, at the same time it detects those face(s). On the standard data sets mentioned prior, the estimates of yaw and in-plane rotation are within 15° of manual estimates over 80% and 95% of the time, respectively.

At this point, while we have discussed and described our invention using some specific examples, our teachings are not so limited. Accordingly, our invention should be only limited by the scope of the claims attached hereto.

What is claimed is:

1. A computer-implemented method of face detection and pose estimation, the method comprising the following steps: training a convolutional neural network to map facial images to points on a face manifold, parameterized by facial pose, and to map non-facial images to points away from the face manifold; and simultaneously determining, whether an image is a face from its proximity to the face manifold and an estimate of facial pose of that image from its projection to the face manifold;

wherein the training step further comprises the step(s) of:
optimizing a loss function of three variables, wherein said variables include image, pose, and face/non-face characteristics of an image;
wherein the loss function is represented by:

$$\text{Loss}(W) = \frac{1}{|S_1|}\sum_{i \in S_1} L_1(W, Z^i, X^i) + \frac{1}{|S_0|}\sum_{i \in S_1} L_0(W, X^i);$$

where $S_1$ is the set of training faces, $S_0$ is the set of non-faces, $L_3(W, Z^1, X^1)$ and $L_0(W, X^1)$ are loss functions for a face sample (with a known pose) and non-face sample, respectively.

2. The method of claim 1, wherein said determination step comprises the step(s) of:
clamping X to an observed value (the image), and finding the values of Z and Y that minimize an energy function $E_W(Y,Z,X)$ according to the following relationship:

$$(Y,Z) = \arg\min_{Y \in \{Y\}, Z \in \{Z\}} E_W(Y,Z,X)$$

where $\{Y\}=\{0, 1\}$ and $\{Z\}=[-90, 90]\times[-45, 45]$ for yaw and roll variables.

3. The method of claim 2, wherein the energy function for a face $E_W(1,Z,X)$, is the distance between the point produced by the network $G_W(X)$ and the point with pose Z on the manifold F(Z) according to the following relationship:

$$E_W(1,Z,X) = \|G_W(X) - F(Z)\|.$$

4. The method of claim 3 wherein the energy function for a non-face $E_W(0,Z,X)$, is equal to a threshold constant T, independent of Z and X that may be represented by the following relationship:

$$E_W(Y,Z,X) = Y\|G_W(X) - F(Z)\| + (1-Y)T.$$

5. The method of claim 1 wherein the determination step comprises:
finding an output label and pose having the smallest energy according to the following relationship:

$$\bar{Z} = \arg\min_{Z \in \{Z\}} \|G_W(X) - F(Z)\| + 1 - Y)T;$$

comparing this minimum distance, $\|G_W(X) - F(\bar{Z})\|$, to threshold T;
classifying X as a face if the minimum distance is smaller than T, otherwise classifying X as a non-face.

* * * * *